(12) United States Patent
Kang et al.

(10) Patent No.: US 8,506,805 B2
(45) Date of Patent: Aug. 13, 2013

(54) SYSTEM AND METHOD FOR INSTALLING FILTERING MEMBRANE MODULE TO FRAME STRUCTURE

(75) Inventors: Moon Sun Kang, Suwon-si (KR); Moo-Seok Lee, Seoul (KR)

(73) Assignees: Kolon Industries, Inc., Kwacheon-Si (KR); Kolon Construction Co., Ltd., Kwacheon-Si (KR)

(*) Notice: Subject to any disclaimer, the term of this patent is extended or adjusted under 35 U.S.C. 154(b) by 466 days.

(21) Appl. No.: 12/682,583

(22) PCT Filed: Oct. 9, 2008

(86) PCT No.: PCT/KR2008/005916
§ 371 (c)(1),
(2), (4) Date: Apr. 9, 2010

(87) PCT Pub. No.: WO2009/048266
PCT Pub. Date: Apr. 16, 2009

(65) Prior Publication Data
US 2010/0270227 A1      Oct. 28, 2010

(30) Foreign Application Priority Data

Oct. 12, 2007 (KR) .................. 10-2007-0102923

(51) Int. Cl.
*B01D 29/00* (2006.01)
*B01D 35/30* (2006.01)
(52) U.S. Cl.
USPC .......... 210/236; 210/237; 210/238; 210/241; 210/249

(58) Field of Classification Search
USPC .................. 210/323.1, 323.2, 241, 237, 238, 210/340, 249, 250, 232, 236; 16/91; 384/24, 384/59; 269/55, 58
See application file for complete search history.

(56) References Cited

U.S. PATENT DOCUMENTS

| | | | | |
|---|---|---|---|---|
| 1,091,947 | A * | 3/1914 | Morgan | 210/198.1 |
| 2,979,204 | A * | 4/1961 | Yeiser | 210/805 |
| 2,996,189 | A * | 8/1961 | Salterbach | 210/155 |
| 5,482,625 | A | 1/1996 | Shimizu et al. | |
| 6,632,358 | B1 | 10/2003 | Suga et al. | |
| 6,875,345 | B2 * | 4/2005 | Hannah | 210/154 |
| 2002/0179517 | A1 * | 12/2002 | Pedersen | 210/321.8 |
| 2006/0021929 | A1 * | 2/2006 | Mannheim et al. | 210/321.6 |

FOREIGN PATENT DOCUMENTS

| | | |
|---|---|---|
| KR | 10-2006-0018682 A | 3/2006 |
| KR | 10-2001-0034351 A | 6/2008 |

* cited by examiner

*Primary Examiner* — David C Mellon
(74) *Attorney, Agent, or Firm* — Birch, Stewart, Kolasch & Birch, LLP

(57) ABSTRACT

A system and method for installing a large-sized filtering membrane module to a frame structure with easiness is disclosed, wherein the system comprises a frame structure to which the filtering membrane module is to be installed; and an installing apparatus for installing the filtering membrane module to the frame structure, wherein the installing apparatus comprises a horizontal rod parallel to an inserting direction of the filtering membrane module into the frame structure; and a moving unit movable toward the frame structure along the horizontal rod while supporting the filtering membrane module.

9 Claims, 9 Drawing Sheets

SYSTEM AND METHOD FOR INSTALLING FILTERING MEMBRANE MODULE TO FRAME STRUCTURE

TECHNICAL FIELD

The present invention relates to a system and method for installing a filtering membrane module, and more particularly, to a system and method for installing a large-sized filtering membrane module to a frame structure.

BACKGROUND ART

A separation method using a membrane has lots of advantages over the method based on heating or phase-changing. Among the advantages is high reliability of water treatment since the water purity required can be easily and stably satisfied by adjusting the size of the pores of a membrane. Furthermore, since the separation method using a membrane does not require a heating process, a membrane can be used with microorganism which is useful for separation process but may be adversely affected by heat.

Among the membrane employing separation methods is a method using a hollow fiber membrane module which comprises a bundle of hollow fiber membranes. Conventionally, the hollow fiber membrane module has been widely used in a micro-filtration field for producing axenic water, drinking water, super pure water, and so on. Recently, however, the application of the hollow fiber membrane module is being expanded to include sewage and waste water treatment, solid-liquid separation in a septic tank, removal of suspended solid (SS) from industrial wastewater, filtration of river, filtration of industrial water, and filtration of swimming pool water.

One kind of the hollow fiber membrane modules is a submerged-type hollow fiber membrane module which is submerged into a water tank filled with fluid to be treated. Negative pressure is applied to the inside of the hollow fiber membranes, whereby only fluid passes through the wall of each membrane and solid elements such as impurities and sludge are rejected and accumulate in the tank. When used for separation, the plural submerged-type hollow fiber membrane modules are installed in a frame structure. A submerged-type hollow fiber membrane module is advantageous in that the manufacturing cost is relatively low and that the installation and maintenance cost may be reduced since a facility for circulating fluid is not required.

However, when a submerged-type hollow fiber membrane module is used to treat wastewater, the solids in the wastewater fouls the membranes causing their permeability to be declined as the water treatment is processed. Thus, while the water treatment is carried out by the hollow fiber membrane module in a water-treatment tank, a maintenance cleaning has to be performed for stably maintaining the high permeability of the membranes. A typical method for the maintenance cleaning is an aeration method. In the aeration method, air is jetted from an aeration pipe positioned under the hollow fiber membrane module during the water treatment, thereby generating rising air bubbles. Thus, foreign materials are removed from the membrane surface owing to the rising air bubbles themselves and the rising water flow caused by the rising air bubble.

Since the maintenance cleaning based on the aeration method uses the rising air bubbles, it is important to maximize the friction between the rising air bubbles and the hollow fiber membrane so as to facilitate the high cleaning efficiency. In this respect, arranging the bundle of hollow fiber membranes to be vertical to the aeration pipe is preferred than arranging them to be parallel to the aeration pipe. Accordingly, a vertical-type hollow fiber membrane module is preferred than a horizontal-type hollow fiber membrane module.

A typical vertical-type hollow fiber membrane module includes an upper header, a lower header, and a bundle of hollow fiber membranes vertically arranged between the upper and lower headers.

Both ends of each of the bundle of the hollow fiber membranes are potted to the upper and lower headers respectively with an adhesive such as polyurethane. For making the potting procedure easier, a fixing rod may be temporarily used so as to stably maintain a predetermined interval between the upper header and the lower header. However, when the fabricated hollow fiber membrane module is installed to the frame structure, the fixing rod is removed preferably. This is because the unchangeable interval between the upper header and the lower header due to the fixing rod does not allow a slightest error in the coupling structure of the frame when the module is installed to it, thereby causing difficulties in installing the hollow fiber membrane module to the frame structure.

In this reason, most of the hollow fiber membrane modules have the upper and lower headers connected with each other only through the bundle of hollow fiber membranes, and the interval between the upper and lower headers is variable. In order to install this type of the hollow fiber membrane module to the frame structure, it is necessary to install the upper and lower headers independently to the frame structure at the same time or approximately at the same time. In case of a small-sized and light-weight hollow fiber membrane module, a man can install it without difficulties. However, with the current trend toward the large-sized hollow fiber membrane module for more water treatment capacity, there is limitations in installing a large-sized hollow fiber membrane to a frame structure only with the human power.

DISCLOSURE

Technical Problem

Therefore, the present invention has been made in view of the above problems, and it is an object of the present invention to provide a system and method for installing a filtering membrane module, which is capable of preventing one or more problems of the related art.

Another object of the present invention is to provide a system and method for installing a filtering membrane module to a frame structure of a filtering apparatus with easiness.

Another object of the present invention is to provide a system and method for installing a large-sized filtering membrane module to a frame structure of a filtering apparatus with easiness, which is capable of easily transporting the filtering membrane module just before or after installing the filtering membrane module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a system for installing a filtering membrane module comprises a frame structure to which the filtering membrane module is to be installed; and an installing apparatus for installing the filtering membrane module to the frame structure, wherein the installing apparatus comprises a horizontal rod parallel to an inserting direction of the filtering membrane module into the frame structure; and a moving unit movable toward the frame structure along the horizontal rod while supporting the filtering membrane module.

In another aspect of the present invention, an apparatus for installing a filtering membrane module to a frame structure comprises a horizontal rod parallel to an inserting direction of the filtering membrane module into the frame structure; and a moving unit movable toward the frame structure along the horizontal rod while supporting the filtering membrane module.

In another aspect of the present invention, a filtering apparatus comprises a filtering membrane module; and a frame structure to which the filtering membrane module is to be installed, wherein a guide groove is formed on at least one side of a header of the filtering membrane module, the guide groove extending along a longitudinal direction of the header, and wherein the frame structure comprises a frontal cross bar perpendicular to an inserting direction of the filtering membrane module at a side for inserting the filtering membrane module, the frontal cross bar provided with a guide rail to be inserted into the guide groove so as to provide a moving path for insertion of the filtering membrane module.

In another aspect of the present invention, a method for installing a filtering membrane module to a frame structure comprises loading the filtering membrane module in an installing apparatus; and inserting the filtering membrane module loaded in the installing apparatus into the frame structure.

Advantageous Effects

A system and method for installing a large-sized filtering membrane module to a frame structure according to the present invention have the following advantages.

First, a large-sized filtering membrane module, in which an interval between upper and lower headers is changeable, can be easily installed to a frame structure of a filtering apparatus.

Also, the filtering membrane module is loaded in an installing apparatus, and then the installing apparatus with the filtering membrane module loaded therein is transported to the frame structure with easiness.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a system and method for installing a hollow fiber membrane module to a frame structure according to the present invention will be explained with reference to the accompanying drawings. The system and method according to the present invention exemplarily illustrate a case for installing the hollow fiber membrane module, however, the system and method according to the present invention may be applicable to many cases for installing various kinds of filtering modules including a flat-type membrane module in addition to the hollow fiber membrane module.

Figure 1:
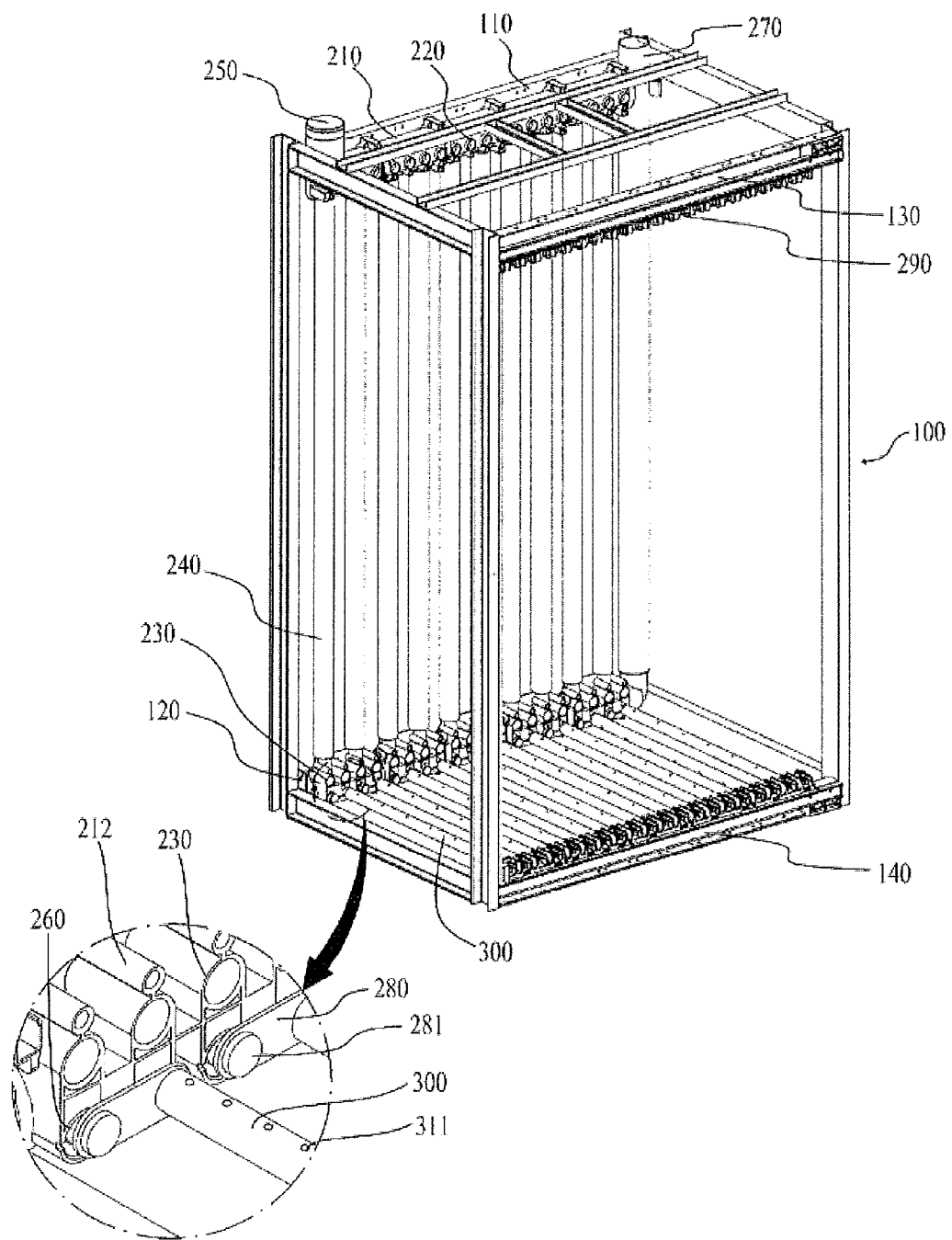
FIG. 1 is a perspective view illustrating a condition of a filtering apparatus according to one embodiment of the present invention, before installing a hollow fiber membrane module thereto.

FIG. 1 is a perspective view illustrating a condition of a filtering apparatus according to one embodiment of the present invention, before installing a hollow fiber membrane module thereto.

As shown in FIG. 1, the filtering apparatus according to one embodiment of the present invention includes a frame structure 100 formed in the shape of rectangular parallelepiped. The frame structure 100 includes four cross bars which are respectively perpendicular to a longitudinal direction of a header of a hollow fiber membrane module to be installed thereto, and a longitudinal direction of a hollow fiber membrane. For convenience of the explanation, one side of the frame structure 100, into which the hollow fiber membrane module is inserted, is referred to as the front, and its opposite side is referred to as the back. In this case, the aforementioned four cross bars may be referred to as the rear upper cross bar 110, the rear lower cross bar 120, the frontal upper cross bar 130, and the frontal lower cross bar 140.

The rear upper cross bar 110 is combined with a permeate collector 210, wherein the permeate collector 210 is provided with a plurality of sub permeate collectors connected, for the sake of fabrication convenience. Each sub permeate collector is provided with a plurality of upper collectors 220 to connect the permeate collector 210 with an upper header of the hollow fiber membrane module. In one embodiment of the present invention, each sub permeate collector is provided with the four upper collectors 220. Owing to the aforementioned structure, permeated water collected in the upper header of the hollow fiber membrane module flows into the permeate collector 210 through the upper collectors 220.

A plurality of lower connectors 230 connected with a lower header of the hollow fiber membrane module are combined with the rear lower cross bar 120, wherein the plurality of lower connectors 230 are located directly under the permeate collector 210. The plurality of lower connectors 230 are connected with the permeate collector 210 through a plurality of vertical pipes 240. Thus, permeated water collected in the lower header of the hollow fiber membrane module flows into the permeate collector 210 after sequentially passing through the lower connectors 230 and vertical pipes 240.

The plurality of lower connectors 230 may be connected with the permeate collector 210 by using the respective vertical pipes 240, separately. In one embodiment of the present invention, a pair of lower connectors 230 use one vertical pipe 240 in common, that is, the pair of lower connectors 230 are connected with the permeate collector 210 by using one vertical pipe 240.

The permeated water flowing into the permeate collector 210 is discharged to the external through a permeated water discharging pipe 250. For improving the spatial efficiency, at least one of the vertical pipes 240 is directly connected with the permeated water discharging pipe 250 without passing through the permeate collector 210.

A plurality of air dispersing pipes 260 are provided for cleaning the hollow fiber membrane, wherein the plurality of air dispersing pipes 260 are located under the respective lower connectors 230. As shown in one embodiment of the present invention, the plurality of lower connectors 230 and air dispersing pipes 260 may be provided by combining units of predetermined number, for the sake of fabrication convenience. For example, the plurality of lower connectors 230 and air dispersing pipes 260 may be provided by combining the plurality of units, wherein each unit is comprised of the two lower connectors 230 and two air dispersing pipes 260. The air dispersing pipe 260 is connected with an external air supplying unit (not shown) through an air supplying pipe 270.

The air dispersing pipes 260 are connected with a plurality of aeration pipes 300 through connection members 280. Each of the air dispersing pipes 260 may be separately connected with the aeration pipe 300. In one embodiment of the present invention, any one of the two air dispersing pipes 260 constituting one unit is connected with the aeration pipe 300, and the other has an opening closed by a sealing member 281. The aeration pipe 300 is provided with a plurality of upwardly-facing aeration holes 311 arranged along a longitudinal direction of the aeration pipe 300 in parallel. Accordingly, air provided from the air supplying unit is jetted toward the hollow fiber membrane module from the aeration holes 311 of the aeration pipe 300 after sequentially passing through the air supplying pipe 270 and the air dispersing pipe 260.

Figure 2:
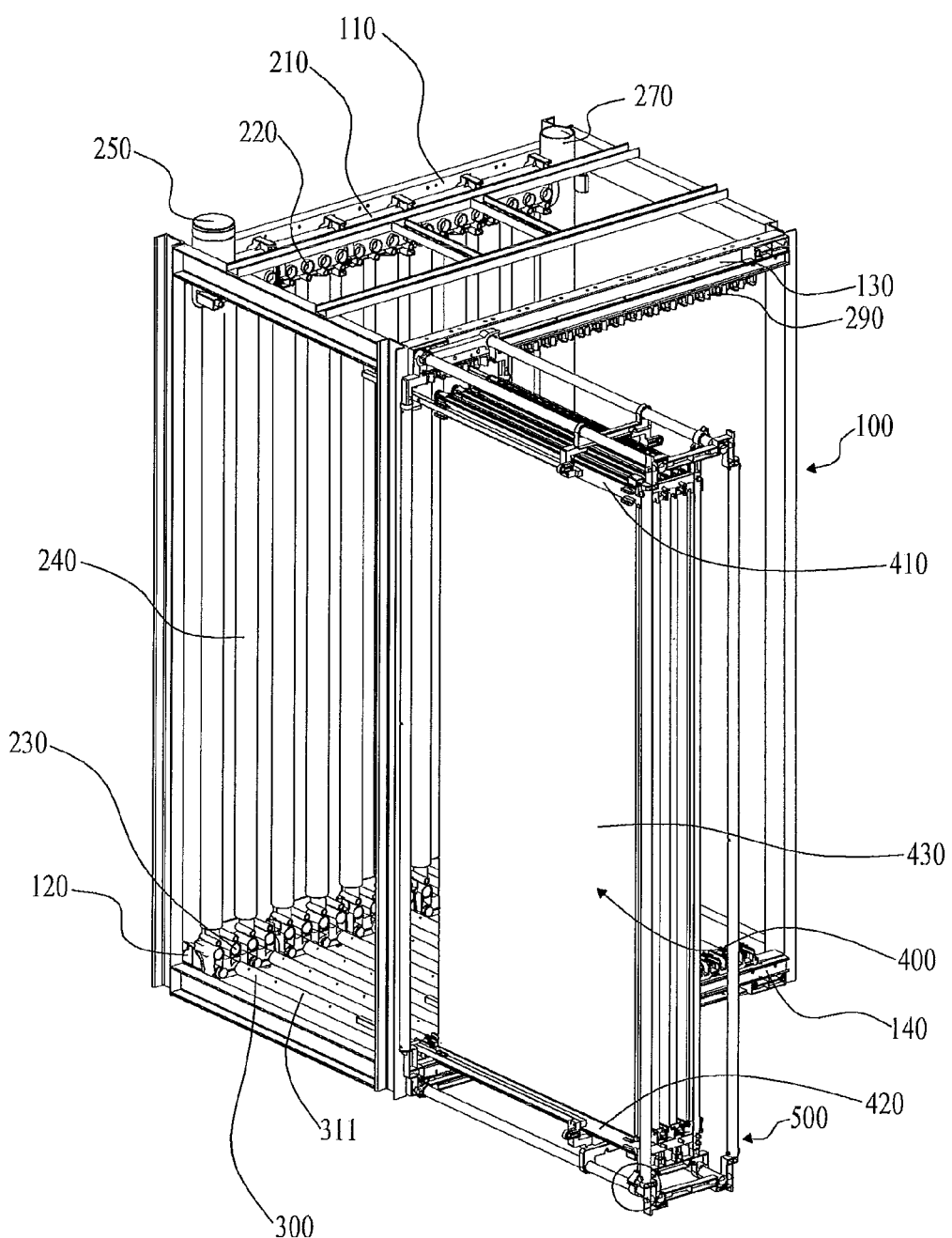
FIG. 2 is a perspective view illustrating a condition where the hollow fiber membrane module is installed to a frame structure of the filtering apparatus according to one embodiment of the present invention.

FIG. 2 is a perspective view illustrating a condition where the hollow fiber membrane module is installed to the frame structure of filtering apparatus according to one embodiment of the present invention.

As shown in FIG. 2, a plurality of hollow fiber membrane modules 400 for filtering impurities from a liquid substrate to be treated are inserted into the frame structure 100 shown in FIG. 1 by an apparatus 500 for installing the hollow fiber membrane module (hereinafter, referred to as "installing apparatus"). One end of the upper header 410 of the hollow fiber membrane module 400 is connected with the upper connector 220, and one end of the lower header 420 of the hollow fiber membrane module 400 is connected with the lower connector 230. Also, the other end of the upper header 410 of the hollow fiber membrane module 400 is connected with an elastic member 290 provided in the frontal upper cross bar 130, and the other end of the lower header 420 of the hollow fiber membrane module 400 is connected with an elastic member 290 provided in the frontal lower cross bar 140. The detailed explanation will be given later.

The plurality of aeration pipes 300 are provided under the hollow fiber membrane module 400 connected with the upper and lower connectors 220 and 230 while being parallel to the upper and lower headers 410 and 420. Since the aeration holes 311 of the aeration pipe 300 faces upward, the air jetted from the aeration holes 311 rises toward the hollow fiber membrane module 400, whereby the pollutant stuck to the follow fiber membrane 430 is removed by the smooth flow of air or water.

Figure 3:
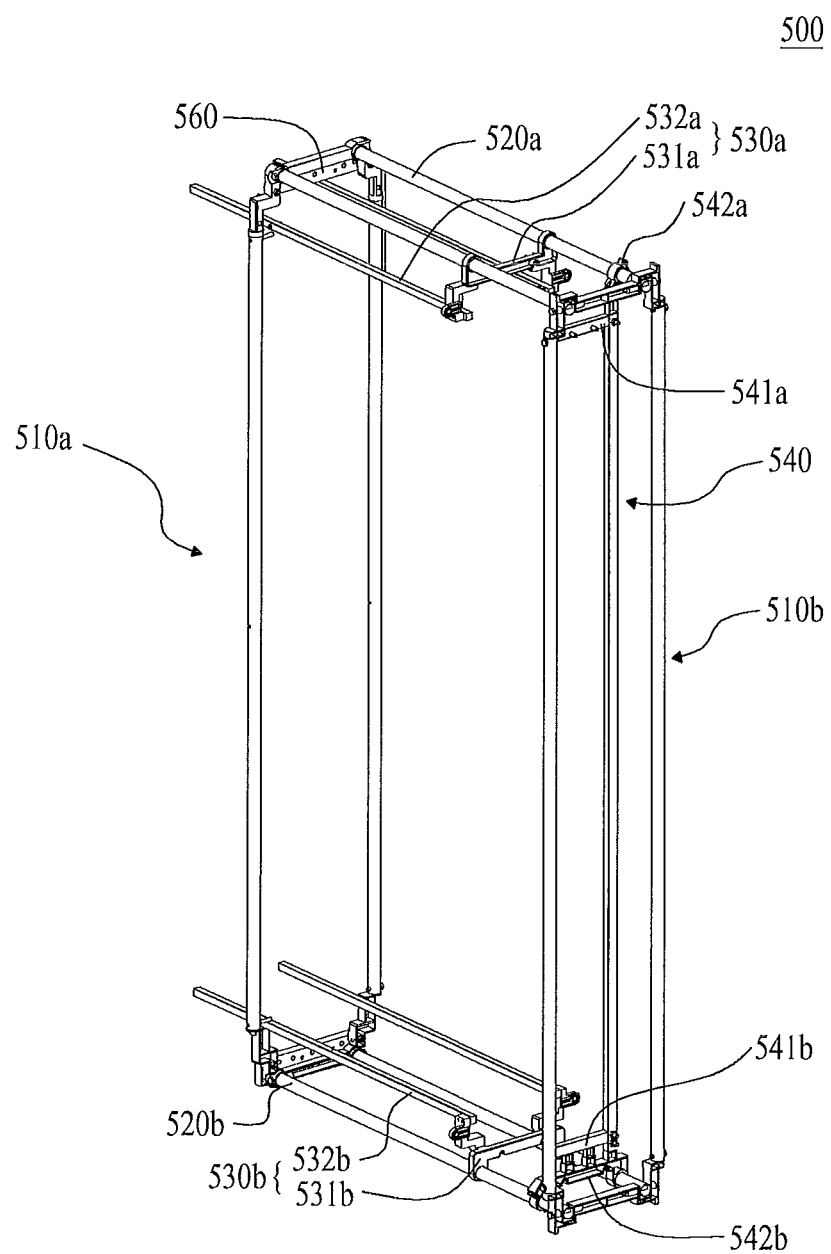
FIG. 3 is a perspective view illustrating an installing apparatus of hollow fiber membrane module according to one embodiment of the present invention.

FIG. 3 is a perspective view illustrating the installing apparatus according to one embodiment of the present invention.

As shown in FIG. 3, the installing apparatus 500 according to one embodiment of the present invention includes first and second frames 510a and 510b, wherein the first and second frames 510a and 510b are respectively located at one side for inserting the hollow fiber membrane module 400, and at its opposite side.

The upper parts of the first and second frames 510a and 510b are respectively combined with both ends of each of the upper horizontal rods 520a constituting the pair, in perpendicular. Also, the lower parts of the first and second frames 510a and 510b are respectively combined with both ends of each of the lower horizontal rods 520b constituting the pair, in perpendicular. When installing the hollow fiber membrane module 400 to the frame structure 100, the position of installing apparatus 500 is adjusted such that the longitudinal direction of the upper and lower horizontal rods 520a and 520b is parallel to the direction for inserting the hollow fiber membrane module 400 into the frame structure 100 of the filtering apparatus.

For guiding the hollow fiber membrane module 400 inserted into the frame structure 100 of the filtering apparatus, the installing apparatus 500 according to one embodiment of the present invention includes upper and lower guide units 530a and 530b which are movable toward the frame structure 100, and more particularly, parallel to the direction for installing the hollow fiber membrane module 400. Even though the upper and lower guide units 530a and 530b are symmetric in position, they are identical in structure. Hereinafter, the upper guide unit 530a will be explained mainly.

The upper guide unit 530a includes a guide plate 531a, and a pair of guide bars 532a. The guide plate 531a is provided with a pair of through-holes, and the pair of upper horizontal rods 520a penetrates the pair of through-holes, respectively. Thus, the guide plate 531a is movable along the pair of upper horizontal rods 520a while being parallel to the direction for installing the hollow fiber membrane module. The two guide bars 532a of the pair are respectively combined with both ends of the guide plate 531a while being parallel to the upper horizontal rod 520a.

According as the upper guide unit 530a is horizontally moved toward the frame structure 100, it is possible to provide a moving path for inserting the hollow fiber membrane module 400 into the frame structure 100 of the filtering apparatus.

The installing apparatus 500 according to one embodiment of the present invention further includes a moving unit 540 which supports the hollow fiber membrane module 400 to be installed to the frame structure 100, and moves the hollow fiber membrane module 400 toward the frame structure 100 while being parallel to the longitudinal direction of the upper and lower headers 410 and 420 of the hollow fiber membrane module 400.

Figure 4:
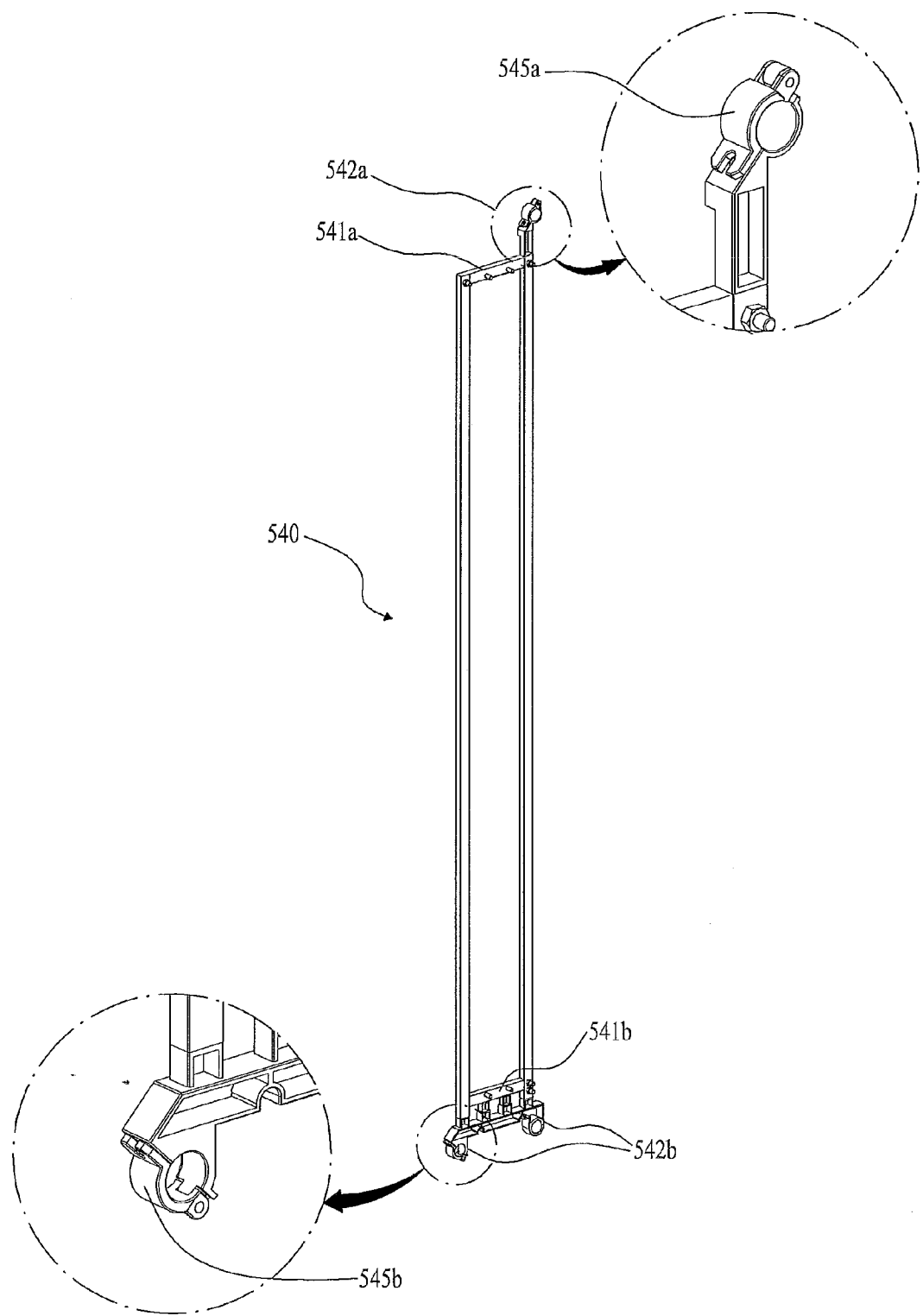
FIG. 4 is a perspective view illustrating a moving unit in the installing apparatus of hollow fiber membrane module according to one embodiment of the present invention.

FIG. 4 is a perspective view illustrating the moving unit in the installing apparatus according to one embodiment of the present invention.

As shown in FIG. 4, the moving unit 540 according to one embodiment of the present invention includes an upper fixing plate 541a which is detachably combined with the upper header 410 of the hollow fiber membrane module to be installed to the frame structure 100 through the use of bolt or the like. Also, an upper supporting unit 542a is provided on the upper fixing plate 541a. In the upper supporting unit 542a, there are the through-holes through which the pair of upper horizontal rods 520a passes. When the upper supporting unit 542a is combined with the upper horizontal rod 520a, it is necessary to ensure the movement of the upper supporting unit 542a relative to the upper horizontal rod 520a, that is, the upper supporting unit 542a is moved along the upper horizontal rod 520a. In one embodiment of the present invention, the moving unit 540 is movably combined with one of the upper horizontal rods 520a through the use of upper supporting unit 542a. However, the moving unit 540 may be combined with both the upper horizontal rods 520a.

The moving unit 540 according to one embodiment of the present invention includes a lower fixing plate 541b which is detachably combined with the lower header 420 of the hollow fiber membrane module to be installed to the frame structure 100 through the use of bolt or the like. Also, a lower supporting unit 542b is provided under the lower fixing plate 541b. In the lower supporting unit 542b, there are the through-holes through which the pair of lower horizontal rods 520b passes. Thus, the lower supporting unit 542b is movably combined with the pair of lower horizontal rods 520b by the through-holes.

In the installing apparatus 500 of FIG. 4 according to one embodiment of the present invention, the upper fixing plate 541a may be detachably combined with the maximum four upper headers 410, and the lower fixing plate 541b may be detachably combined with the maximum four lower headers 420. Thus, the moving unit 540 according to one embodiment of the present invention can move the maximum four hollow fiber membrane modules 400 toward the frame structure 100 at the same time. However, it is apparent to those skilled in the art that the maximum number of hollow fiber membrane modules 400 to be installed at the same time can be increased by the simple change of design.

According to one embodiment of the present invention, the upper supporting unit 542a includes a first pivot member 545a. As the first pivot member 545a is pivotally moved in a first direction, the through-hole is formed, through which the upper horizontal rod 520a passes. Meanwhile, when the first pivot member 545a is pivotally moved in a second direction being opposite to the first direction, the through-hole becomes open whereby the connection between the upper supporting unit 542a and the upper horizontal rod 520a is released. Accordingly, under the condition that the through-hole is formed, it is preferable that the first pivot member 545a be fixed through the use of bolt or the like to prevent the first pivot member 545a from being pivotally moved in the second direction. If the upper supporting unit 542a is movably combined with both the upper horizontal rods 520a constituting the pair, it is preferable to selectively open the two through-holes.

According to one embodiment of the present invention, one of the two through-holes of the lower supporting unit 542b, penetrated by the pair of lower horizontal rods 520b, can be open selectively. That is, the lower supporting unit 542b includes a second pivot member 545b. The pivot movement of the second pivot member 545b enables the through-hole to open. If all selectively-openable through-holes are open by pivotally moving the first and second pivot members 545a and 545b, the entire moving unit 540 can be pivotally moved on the lower horizontal rod 520b penetrating the unopened through-hole of the lower supporting unit 542b.

After the moving unit 540 is laid down parallel to the group, the upper and lower headers 410 and 420 of the hollow fiber membrane module 400 to be installed to the frame structure 100 are detachably combined with the upper and lower fixing plates 541a and 541b. Then, the moving unit 540 combined with the hollow fiber membrane module 400 is erected, and then the first and second pivot members 545a and 545b are adjusted such that the upper and lower horizontal rods 520a and 520b penetrate the through-holes of the upper and lower supporting units 542a and 542b. Through the aforementioned method, the hollow fiber membrane module 400 can be easily loaded in the installing apparatus 500.

Figure 5:
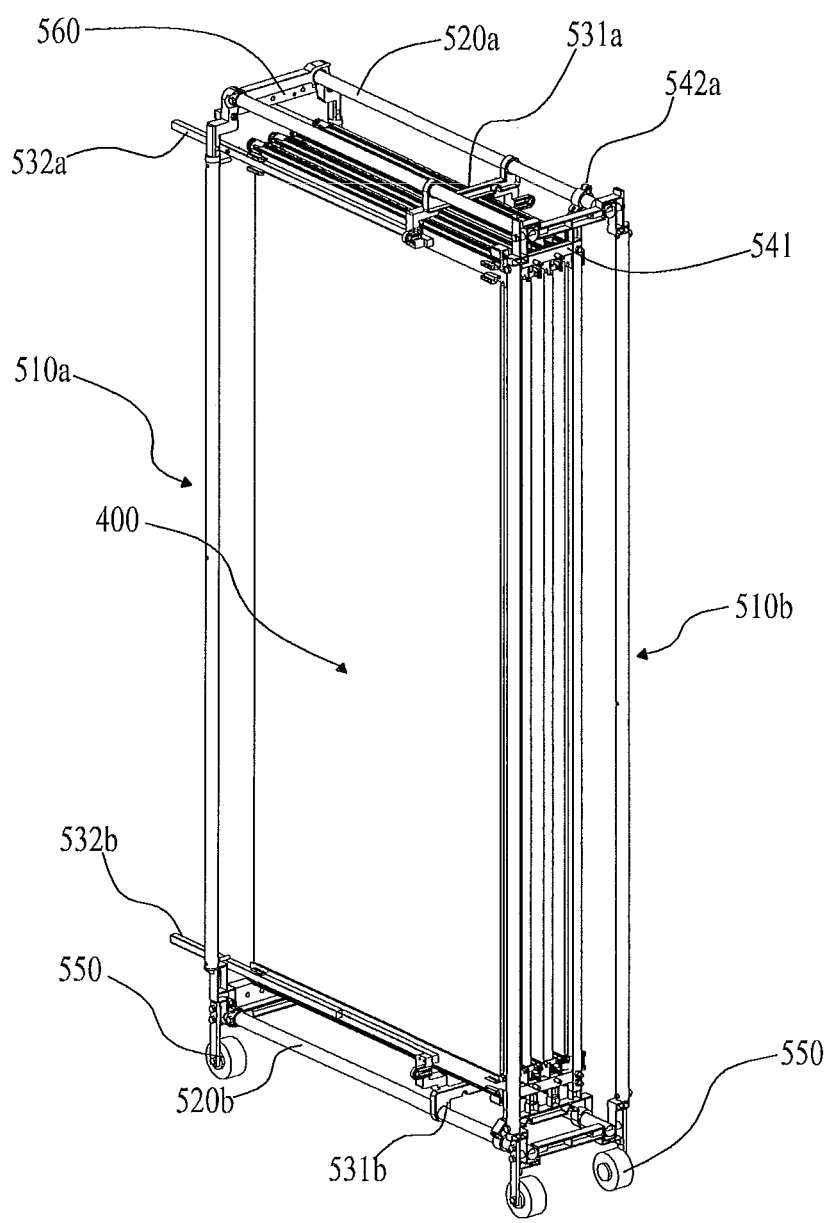
FIG. 5 illustrates a condition where the hollow fiber membrane module is loaded in the installing apparatus according to one embodiment of the present invention.

FIG. 5 illustrates a condition where the hollow fiber membrane module is loaded in the installing apparatus according to one embodiment of the present invention.

As shown in FIG. 5, the installing apparatus 500 according to one embodiment of the present invention further includes wheels 550 combined with lower sides of the first and second frames 510a and 510b. Accordingly, the installing apparatus 500 in which the hollow fiber membrane module 400 is loaded at a first location can be easily transported to a second location where the frame structure 100 is placed for installation of the hollow fiber membrane module 400.

For installing the hollow fiber membrane module 400 to the frame structure 100 by using the installing apparatus 500 transported to the second location where the frame structure 100 is placed, it is necessary to place the installing apparatus 500 with the hollow fiber membrane module 400 at the precise location of the frame structure 100, and to combine the installing apparatus 500 with the frame structure 100 without change in their positions.

Figure 6:
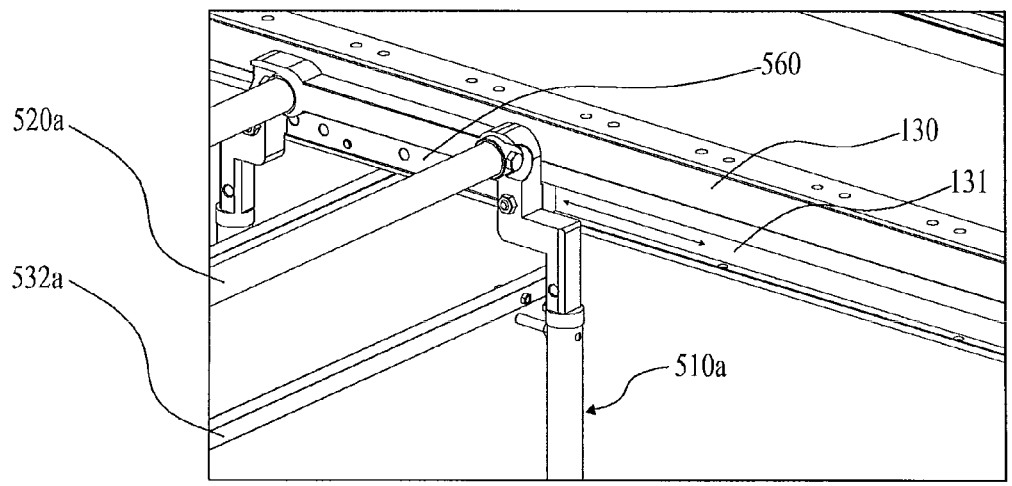
FIG. 6 illustrates a condition where the installing apparatus of hollow fiber membrane module according to one embodiment of the present invention is combined with the frame structure.

FIG. 6 illustrates the condition where the installing apparatus is combined with the frame structure 100.

As shown in FIG. 6, a slide groove 131 is provided at a front face of the frontal upper cross bar 130, wherein the slide groove 131 is extended in a longitudinal direction of the frontal upper cross bar 130. The installing apparatus 500 according to one embodiment of the present invention further includes a slide member 560 which is provided in the upper part of the first frame 510a. The slide member 560 is moved along the slide groove 131 while being inserted into the slide groove 131.

Although not shown in FIG. 6, a slide groove may be provided in the frontal lower cross bar 140 of the frame structure 100, and a slide member may be provided in the lower part of the first frame 510a of the installing apparatus, wherein the slide member may be moved along the slide groove while being inserted into the slide groove. Thus, a user can move the installing apparatus 500 along the slide groove 131 so as to place the installing apparatus 500 with the hollow fiber membrane module 400 at the precise location of the frame structure 100 with preciseness.

Figure 7:
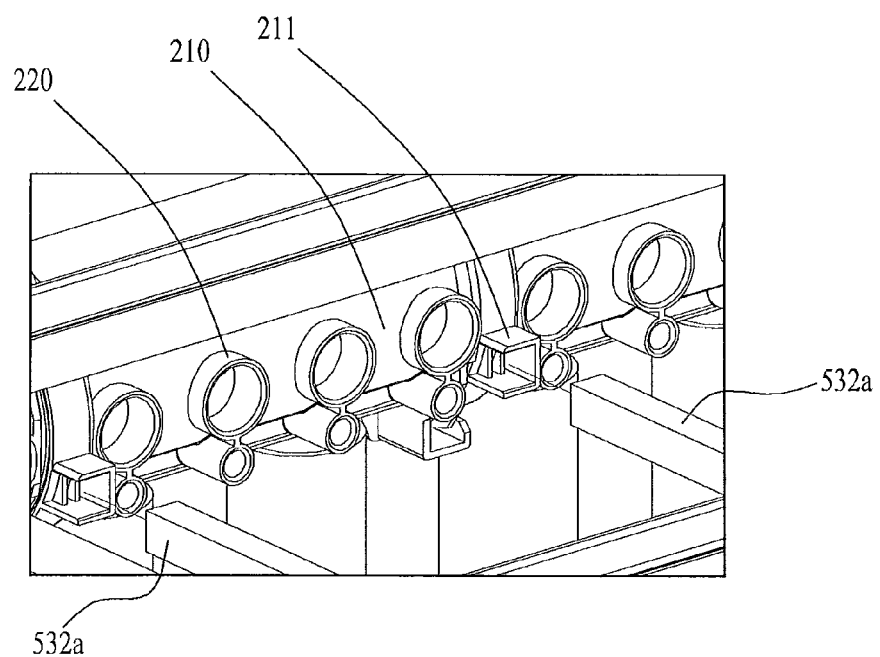
FIG. 7 illustrates a moment when an upper guide unit is horizontally moved toward the frame structure according to one embodiment of the present invention.

FIG. 7 illustrates the moment when the upper guide unit is horizontally moved toward the frame structure.

As shown in FIG. 7, the permeate collector 210 is provided with a plurality of guide bar receivers 211. The upper guide unit 530a horizontally moved toward the frame structure 100 is supported according as the end part of the guide bar 532a of the upper guide unit 530a is inserted into the guide bar receiver 211. Accordingly, the guide bar 532a enables the stable and exact moving path of the hollow fiber membrane module 400 inserted into the frame structure 100 of the filtering apparatus from the installing apparatus 500. Also, the guide bar 532b of the lower guide unit 530b is inserted into a guide bar receiver provided on the lower connector 230.

Figure 8:
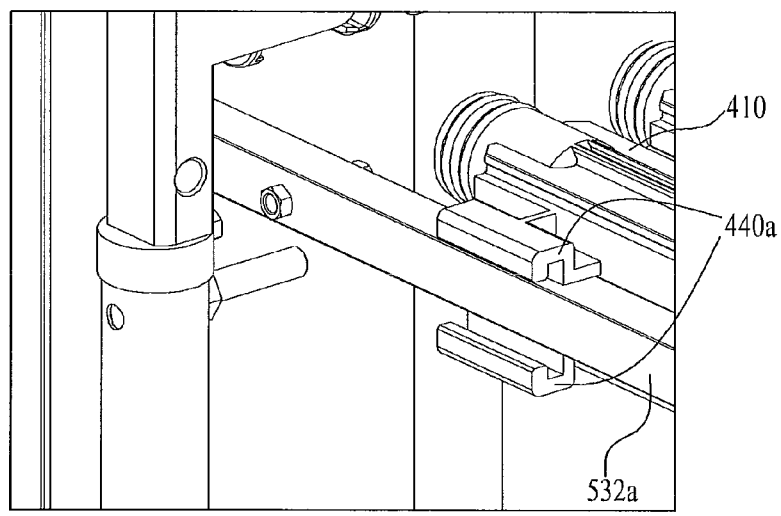
FIGS. 8 and 9 illustrate a condition where the hollow fiber membrane module is guided to the frame structure of the filtering apparatus by guide bars of upper and lower guide units according to one embodiment of the present invention.
Figure 9:
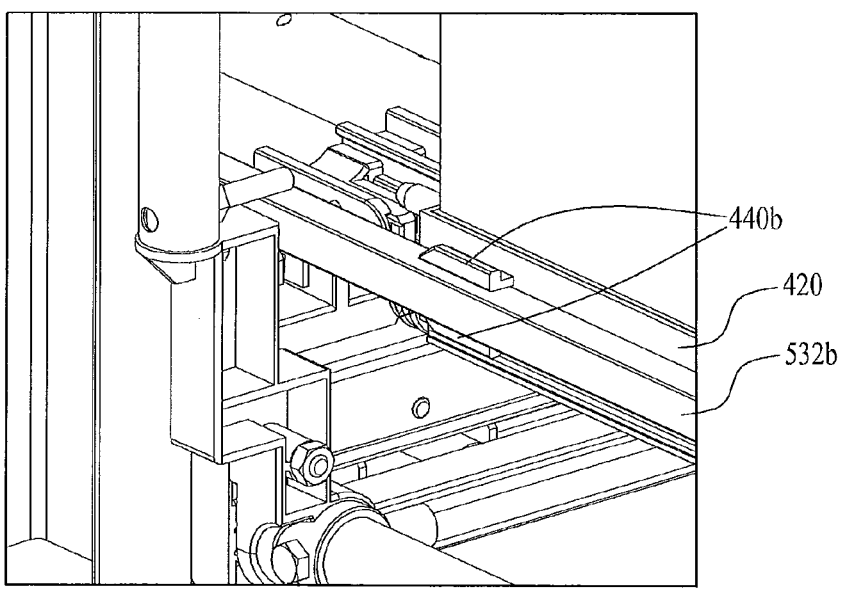

FIGS. 8 and 9 illustrate a condition where the hollow fiber membrane module according to one embodiment of the present invention is guided to the frame structure of the filtering apparatus by the guide bars of the upper and lower guide units.

As shown in FIG. 8, a pair of first coupling ribs 440a is provided at one lateral side of the upper header 410 of the hollow fiber membrane module 400, wherein the first coupling ribs 440a constituting the pair are symmetric with respect to the upper guide bar 532a, that is, the upper guide bar 532a is interposed between the symmetrically-positioned first coupling ribs 440a. At the other lateral side of the upper header 410, there is a pair of second coupling ribs 440b, wherein the second coupling ribs 440b are symmetric with respect to the upper guide bar 532a, that is, the upper guide bar 532a is interposed between the symmetrically-positioned second coupling ribs 440b. At this time, the second coupling ribs 440b are provided in the shape suitable for being engaged with the first coupling ribs 440a, respectively.

Preferably, the interval between the first coupling ribs 440a is identical to the interval between the second coupling ribs 440b, and the first and second coupling ribs 440a and 440b are respectively provided at the lateral sides of both end parts of the upper header 410. Accordingly, the hollow fiber membrane module 400 according to one embodiment of the present invention includes the two pairs of first coupling ribs 440a, respectively provided at the first lateral sides of the frontal and rear upper parts, and the two pairs of second coupling ribs 440b, respectively provided at the second lateral sides of the frontal and rear upper parts.

The lower header 420 of the hollow fiber membrane module 400 according to one embodiment of the present invention also includes first and second coupling ribs 440a and 440b with the guide bar 532b of the lower guide unit 530b interposed therebetween. FIG. 9 exemplarily illustrates the pair of second coupling ribs 440b provided at the lateral side of the lower header 420, and the guide bar 532b of the lower guide unit 530b interposed between the second coupling ribs 440b.

Owing to the aforementioned structure, the hollow fiber membrane module 400 can be inserted into the frame structure 100 of the filtering apparatus by the guide bars 532a and 532b.

As mentioned above, the maximum four hollow fiber membrane modules 400 can be installed to the installing apparatus 500 at the same time. One reason for enabling the simultaneous installation of the hollow fiber membrane modules is the first and second coupling ribs 440a and 440b provided at both lateral sides of the upper and lower headers 410 and 420 of the hollow fiber membrane module 400.

Hereinafter, the process for installing the four hollow fiber membrane modules to the frame structure according to one embodiment of the present invention at the same time will be explained with reference to FIG. 10.

Figure 10:
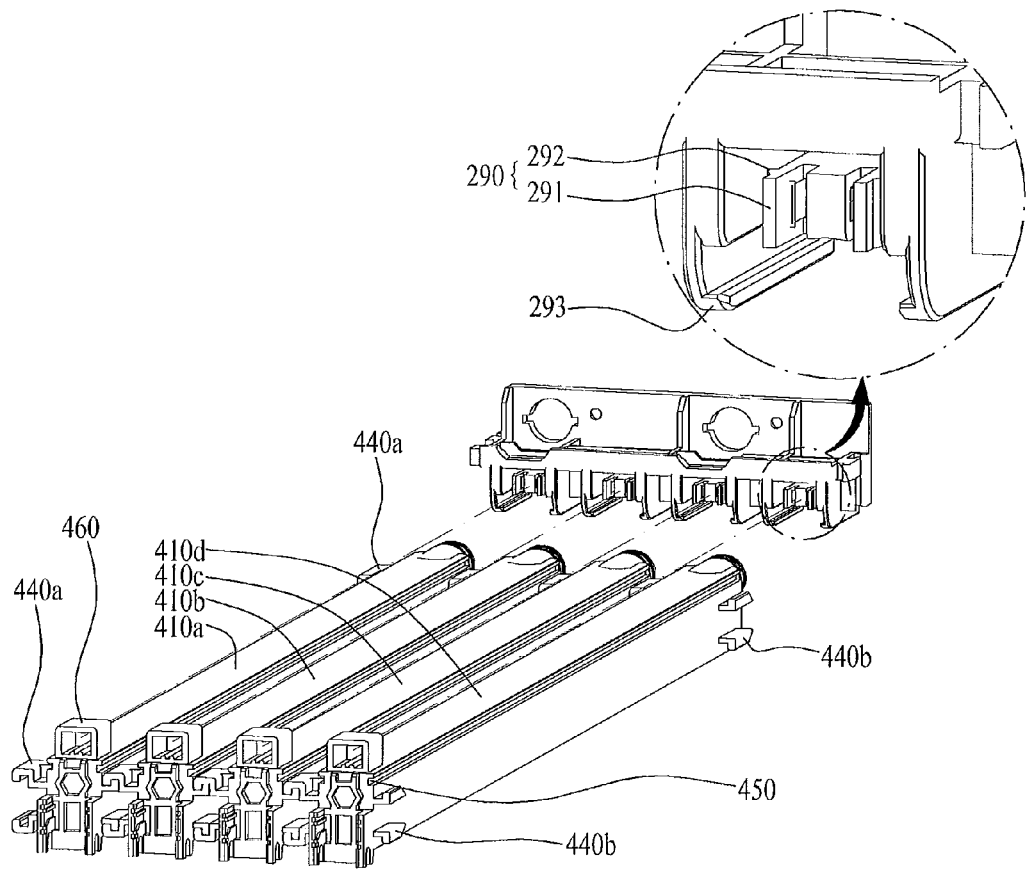
FIG. 10 illustrates a condition where the four hollow filter membrane modules are installed to the frame structure according to one embodiment of the present invention at the same time.

In FIG. 10, supposing that the upper headers 410 of the four hollow fiber membrane modules 400 are referred to as the first upper header 410a, the second upper header 410b, the third upper header 410c, and the fourth upper header 410d in order. As shown in FIG. 10, the second coupling rib 440b provided at the second lateral side of the first upper header 410a is engaged with the first coupling rib 440a provided at the first lateral side of the second upper header 410b. Also, the second coupling rib 440b provided at the second lateral side of the second upper header 410b is engaged with the first coupling rib 440a provided at the first lateral side of the third upper header 410c. The second coupling rib 440b provided at the second lateral side of the third upper header 410c is engaged with the first coupling rib 440a provided at the first lateral side of the fourth upper header 410d. As a result, the first to fourth upper headers 410a, 410b, 410c, and 410d are combined by engaging the first and second coupling ribs 440a and 440b provided at the respective upper headers 410.

Furthermore, since the first to fourth lower headers are respectively provided with the first and second coupling ribs, the first to fourth lower headers are combined by engaging the first and second coupling ribs provided at the respective lower headers.

The four hollow fiber membrane modules 400 combined by the upper and lower headers 410 and 420 are moved like one integrated body at least in a vertical direction. Meanwhile, according as the two upper guide bars 532a constituting the pair are respectively interposed between the first coupling ribs 440a provided at the first lateral side of the first upper header 410a, and between the second coupling ribs 440b provided at the second lateral side of the fourth upper header 410d, the first and fourth upper headers are guided. Also, the first and fourth upper headers 410a and 410d are engaged with the second and third upper headers 410b and 410c provided therebetween, and the four upper headers 410a, 410b, 410c, and 410d are combined with the moving unit 540 of the installing apparatus 500 according to one embodiment of the present invention. As a result, the pair of upper guide bars 532a provides the moving paths for the four upper headers 410a, 410b, 410c, and 410d. In the same method, the pair of lower guide bars 532b provides the moving paths for the four lower headers 420a, 420b, 420c, and 420d.

Among the four hollow fiber membrane modules 400 installed to the frame structure 100, the respective first and fourth hollow fiber membrane modules are combined with the other hollow fiber membrane modules previously installed to the frame structure or to be installed to the frame structure by engaging the first or second coupling rib 440a or 440b. As a result, when the hollow fiber membrane modules 400 are installed to the filtering apparatus according to one embodiment of the present invention, the adjourning hollow fiber membrane modules can be combined by the upper and lower headers 410 and 420. After completing the procedure for installing the hollow fiber membrane module 400 to the filtering apparatus, it is possible to decrease the vibration of the hollow fiber membrane module 400 caused by the air jetted from the aeration pipe 300 for the maintenance cleaning of the hollow fiber membrane 430, and to prevent the crack in the respective connections parts caused by the vibration.

As shown in FIG. 10, guide grooves 450 are provided along the longitudinal direction of the upper header 410 at both sides of the upper header 410 of the hollow fiber membrane module 400 according to one embodiment of the present invention. Also, a guide rail 293 is provided in the frontal upper cross bar 130 of the frame structure 100, wherein the guide rail 293 inserted into the guide groove 450 provides the moving path of the hollow fiber membrane module 400. The guide rail 293 is extended in the insertion direction of the hollow fiber membrane module 400. The guide groove 450 and the guide rail 293 enable the exact moving path of the hollow fiber membrane module 400 installed to the frame structure 100, so that the user can install the hollow fiber membrane module 400 to the frame structure 100 with easiness.

According as first end parts of the upper and lower headers 410 and 420 of the hollow fiber membrane module 400 are respectively connected with the upper and lower connectors 220 and 230, and second end parts of the upper and lower headers 410 and 420 of the hollow fiber membrane module 400 are respectively connected with the elastic members 290 provided in the frontal upper cross bar 130 and frontal lower cross bar 140, the installation of hollow fiber membrane module 400 is completed, which will be explained in detail.

As shown in FIG. 10, a connection ring 460 with a central hole therein is provided at the second end part of the upper header 410 of the hollow fiber membrane module 400 according to one embodiment of the present invention. The connection ring 460 is combined with the elastic member 290 provided in the frontal upper cross bar 130 of the frame structure 100 when the hollow fiber membrane module 400 is completely inserted into the frame structure 100.

In more detail, the elastic member 290 includes a pair of elastic wings 291, and a protrusion provided in the elastic wing 291. Just before the installation of hollow fiber membrane module 400 is completed, the pair of elastic wings 291 pass through the hole provided in the connection ring 460 of the upper header 410. In this case, when the protrusion 292 provided in the elastic wing 291 passes through the hole of the connection ring 460, the two elastic wings 291 constituting the pair become bent to the direction for increasing or decreasing the interval between the two elastic wings 291. As soon as the protrusion 292 of the elastic member 290 passes through the hole of the connection ring 460, the pair of elastic wings 291 is restored to its original position by elasticity. The hollow fiber membrane module 400 installed to the frame structure 100, more particularly, the connection ring 460 is fixedly provided within the frame structure 100 by the protrusion 292 of the elastic member 290, without being separated from the frame structure 100. Owing to the connection between the connection ring 460 and the elastic member 290, the hollow fiber membrane module 400 is strongly supported within the frame structure 100, so that it is possible to prevent the hollow fiber membrane module from being shaken, distorted or vibrated. When taking out the hollow fiber membrane module 400 from the frame structure 100, the interval between the two elastic wings 291 constituting the pair is decreased forcibly, and then the hollow fiber membrane module 400 is taken out from the frame structure 100.

Although not shown, a connection ring with a central hole therein is provided at the second end part of the lower header 420 of the hollow fiber membrane module 400 according to one embodiment of the present invention. Also, an elastic member is provided in the frontal lower cross bar 140 of the frame structure 100. Accordingly, the connection ring of the lower header 420 is combined with the elastic member provided in the frontal lower cross bar 140 of the frame structure 100 when the hollow fiber membrane module 400 is completely inserted into the frame structure 100.

Figure 11:
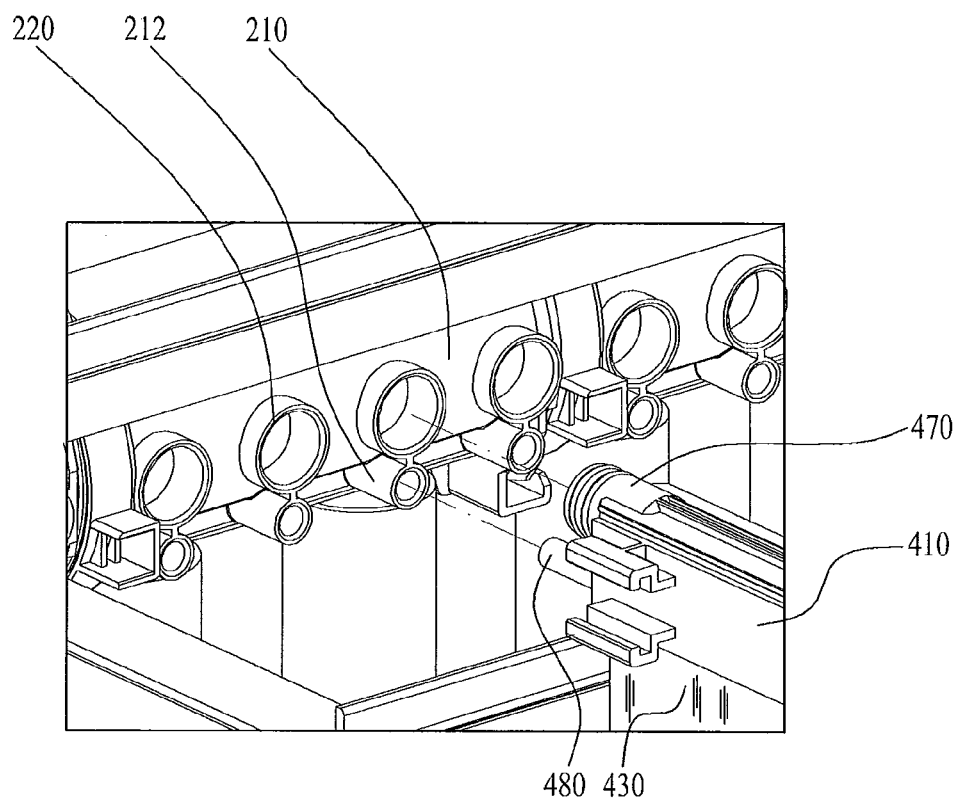
FIG. 11 illustrates a condition just before an upper header of the hollow fiber membrane module according to one embodiment of the present invention is combined with an upper connector provided in a permeate collector of the filtering apparatus.

FIG. 11 illustrates the condition just before the upper header of the hollow fiber membrane module according to one embodiment of the present invention is combined with the upper connector provided in the permeate collector of the filtering apparatus.

As shown in FIG. 11, a conduit 470 is provided in the first end part of the upper header 410 of the hollow fiber membrane module 400 according to one embodiment of the present invention, wherein the conduit 470 is used for discharging the permeated water collected in the upper header 410 through the hollow fiber membrane 430. According as the hollow fiber membrane module 400 is inserted into the frame structure 100 of the filtering apparatus, the conduit 470 is combined with the upper connector 220 of the permeate collector 210. In one embodiment of the present invention, the conduit 470 is inserted into the upper connect or 220, and an O-ring is interposed between the conduit 470 and the upper connector 220.

As shown in FIG. 11, the upper header 410 of the hollow fiber membrane module 400 according to one embodiment of the present invention includes a reinforcing member 480 provided underneath the conduit 470. The location of reinforcing member 480 relative to the conduit 470 may be easily changed by those skilled in the art at needed.

According as the hollow fiber membrane module 400 is inserted into the frame structure 100 of the filtering apparatus, the reinforcing member 480 of the upper header 410 is combined with a reinforcing member receiver 212 provided in the permeate collector 210. In one embodiment of the present invention, the reinforcing member 480 is inserted into the reinforcing member receiver 212.

Also, a conduit 470 and a reinforcing member 480 provided in the first end part of the lower header 420 of the hollow fiber membrane module 400 are respectively combined with the lower connector 230 and a reinforcing member receiver 212.

In the case of the filtering apparatus with the hollow fiber membrane module 400 installed thereto, the connection between the reinforcing member 480 and the reinforcing member receiver 212 improves the endurance in the entire filtering apparatus. That is, when the air is jetted from the aeration pipe 300 for the maintenance cleaning of the hollow fiber membrane 430, it is possible to prevent the hollow fiber from being vibrated or distorted, and to prevent the crack in the respective connections parts, for example, the connection part of conduit 470 and connection ring 460, caused by the vibration or distortion.

Hereinafter, the detailed method for installing the hollow fiber membrane module 400 to the frame structure 100 through the use of installing apparatus 500 will be explained as follows.

The method for installing the hollow fiber membrane module 400 according to one embodiment of the present invention largely includes steps of loading the hollow fiber membrane module 400 in the installing apparatus 500; and inserting the hollow fiber membrane module 400, loaded in the installing apparatus 500, into the frame structure 100. Selectively, the method further includes a step of providing the path for inserting the hollow fiber membrane module 400 into the frame structure 100.

The step of loading the hollow fiber membrane module 400 in the installing apparatus 500 will be explained in detail.

First, according as the first pivot member 545a is pivotally moved, the connection between the upper supporting unit 542a and the upper horizontal rod 520a is released. Also, according as the second pivot member 545b is pivotally moved, one of the two through-holes of the lower supporting unit 542b becomes open. Then, the entire moving unit 540 is pivotally moved on the lower horizontal rod 520b penetrating the unopened through-hole of the lower supporting unit 542b. As the moving unit 540 is laid down parallel to the ground by the aforementioned method, the upper and lower headers 410 and 420 of the hollow fiber membrane module 400 to be installed to the frame structure 100 can be easily combined with the upper and lower fixing plates 541a and 541b.

At this time, the hollow fiber membrane module 400 is combined with the moving unit 540 under the condition that the hollow fiber membrane 430 of the hollow fiber membrane module 400 is placed in parallel. That is, the hollow fiber membrane module 400 is combined with the moving unit 540 under the condition that the longitudinal direction of the headers 410 and 420 of the hollow fiber membrane module 400 is perpendicular to the insertion direction of the hollow fiber membrane module 400 into the frame structure 100.

Then, the moving unit 540 combined with the hollow fiber membrane module 400 is erected, and then the first and second pivot members 545*a* and 545*b* are adjusted such that the upper and lower horizontal rods 520*a* and 520*b* penetrate the through-holes of the upper and lower supporting units 542*a* and 542*b*. At this time, the hollow fiber membrane 430 of the hollow fiber membrane module 400 is placed in vertical. That is, the direction of the hollow fiber membrane module 400 combined with the moving unit 540 is changed so as to make the longitudinal direction of the headers 410 and 420 of the hollow fiber membrane module 400 be parallel to the insertion direction of the hollow fiber membrane module 400 into the frame structure 100.

After loading the hollow fiber membrane module 400 in the installing apparatus 500, the installing apparatus 500 with the hollow fiber membrane module 400 loaded therein is transported to the frame structure 100. According to one embodiment of the present invention, the wheels 550 are combined with the lower sides of the first and second frames 510*a* and 510*b*, whereby the installing apparatus 500 in which the hollow fiber membrane module 400 is loaded at the first location is transported to the second location where the frame structure 100 is placed for installation of the hollow fiber membrane module 400.

Thereafter, the installing apparatus 500 is placed at the precise location for the frame structure 100 to be provided with the hollow fiber membrane module 400, and is then fixedly provided without change in position. According to one embodiment of the present invention, the slide member 560 provided in the first frame 510*a* of the installing apparatus 500 is moved along the slide groove 131 while being inserted into the slide groove 131 provided in the frontal cross bar 130 and 140 of the frame structure 100, whereby the installing apparatus 500 is placed at the precise location for the frame structure 100 to be provided with the follow fiber membrane module 400.

After placing the installing apparatus 500 at the precise location for the frame structure 100 to be provided with the follow fiber membrane module 400, there is provided with the path for inserting the hollow fiber membrane module 400 loaded in the installing apparatus 500 into the frame structure 100. According as the upper and lower guide units 530*a* and 530*b* of the installing apparatus 500 are horizontally moved toward the frame structure 100 along the upper and lower horizontal rods 520*a* and 520*b* of the installing apparatus 500, the end parts of the guide bars 532*a* and 532*b* are inserted into the guide bar receivers 211, respectively. Accordingly, it is possible to provide the stable and exact moving path for insertion of the hollow fiber membrane module 400.

According as the moving unit 540 with the hollow fiber membrane module 400 detachably combined is horizontally moved toward the frame structure 100 along the upper and lower horizontal rods 520*a* and 520*b*, the hollow fiber membrane module 400 is inserted into the frame structure 100.

Since the guide bars 532*a* and 532*b* are respectively interposed between the first coupling ribs 440*a* constituting the pair, and between the second coupling ribs 440*b* constituting the pair provided at the lateral sides of the inserted hollow fiber membrane module 400, the hollow fiber membrane module 400 can be inserted into the frame structure 100 along the moving path provided by the guide bars 532*a* and 532*b*.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A system for installing a filtering membrane module comprising:
    a frame structure to which the filtering membrane module is to be installed; and
    an installing apparatus for installing the filtering membrane module to the frame structure,
    wherein the installing apparatus comprises:
    a horizontal rod parallel to an inserting direction of the filtering membrane module into the frame structure;
    a moving unit movable toward the frame structure along the horizontal rod while supporting the filtering membrane module; and
    a guide unit movable toward and into the frame structure along the horizontal rod,
    wherein the guide unit is movable independently from the moving unit so as to provide a path for insertion of the filtering membrane inside the frame structure, and
    wherein the moving unit comprises:
    a fixing plate to be detachably combined with a header of the filtering membrane module; and
    a supporting unit having side fixed to the fixing plate, and the other side movably connected to the horizontal rod.

2. The system according to claim 1, wherein the supporting unit includes a pivot member, pivotal movement of the pivot member in a first direction makes a closed through-hole to be penetrated by the horizontal rod, and pivotal movement of the pivot member in a second direction opposite to the first direction makes the closed through-hole open.

3. The system according to claim 1, wherein the frame structure comprises a frontal cross bar perpendicular to the inserting direction of the filtering membrane module at a side for inserting the filtering membrane module, and a slide groove is formed on a front face of the frontal cross bar, the slide groove extending in a longitudinal direction of the frontal cross bar; and
    wherein the installing apparatus further comprises a slide member to be inserted into the slide groove so as to enable the installing apparatus to move along the slide groove.

4. The system according to claim 1, wherein a guide groove is formed on at least one side of a header of the filtering membrane module, the guide groove extending along a longitudinal direction of the header; and
    wherein the frame structure comprises a frontal cross bar perpendicular to the inserting direction of the filtering membrane module at a side for inserting the filtering membrane module, the frontal cross bar provided with a guide rail to be inserted into the guide groove so as to provide a moving path for insertion of the filtering membrane module.

5. A system for installing a filtering membrane module comprising:
    a frame structure to which the filtering membrane module is to be installed; and
    an installing apparatus for installing the filtering membrane module to the frame structure,
    wherein the installing apparatus comprises:
    a horizontal rod parallel to an inserting direction of the filtering membrane module into the frame structure;

a moving unit movable toward the frame structure along the horizontal rod while supporting the filtering membrane module; and a guide unit movable toward and into the frame structure along the horizontal rod, wherein the guide unit is movable independently from the moving unit so as to provide a path for insertion of the filtering membrane inside the frame structure, and wherein the guide unit comprises:

a guide plate having a through-hole penetrated by the horizontal rod, the guide plate being movable along the horizontal rod; and a guide bar combined with the guide plate, the guide bar having a longitudinal direction parallel to the horizontal rod.

6. The system according to claim 5, wherein a pair of coupling ribs of symmetric shapes are provided at a lateral side of a header of the filtering membrane module, and the guide bar is to be interposed between the pair of coupling ribs.

7. The system according to claim 5, wherein the frame structure comprises a guide bar receiver capable of supporting the guide bar by receiving an end part of the guide bar.

8. The system according to claim 5, wherein the frame structure comprises a frontal cross bar perpendicular to the inserting direction of the filtering membrane module at a side for inserting the filtering membrane module, and a slide groove is formed on a front face of the frontal cross bar, the slide groove extending in a longitudinal direction of the frontal cross bar; and wherein the installing apparatus further comprises a slide member to be inserted into the slide groove so as to enable the installing apparatus to move along the slide groove.

9. The system according to claim 5, wherein a guide groove is formed on at least one side of a header of the filtering membrane module, the guide groove extending along a longitudinal direction of the header; and wherein the frame structure comprises a frontal cross bar perpendicular to the inserting direction of the filtering membrane module at a side for inserting the filtering membrane module, the frontal cross bar provided with a guide rail to be inserted into the guide groove so as to provide a moving path for insertion of the filtering membrane module.

* * * * *